US011321246B2

(12) United States Patent
Dasar et al.

(10) Patent No.: US 11,321,246 B2
(45) Date of Patent: *May 3, 2022

(54) SUPPORT INFORMATION PROVISIONING SYSTEM (71) Applicant: Dell Products L.P., Round Rock, TX (US)

(72) Inventors: Sundar Dasar, Round Rock, TX (US); Divya Vijayvargiya, Cedar Park, TX (US); Sanjay Rao, Austin, TX (US); Yogesh Prabhakar Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 166 days.

This patent is subject to a terminal disclaimer.

(21) Appl. No.: 16/193,746

(22) Filed: Nov. 16, 2018

(65) Prior Publication Data
US 2019/0087358 A1 Mar. 21, 2019

Related U.S. Application Data (63) Continuation of application No. 15/660,020, filed on Jul. 26, 2017, now Pat. No. 10,152,432.

(51) Int. Cl.
*G06F 13/10* (2006.01)
*G06F 21/62* (2013.01)
(Continued)

(52) U.S. Cl.
CPC ............ *G06F 13/102* (2013.01); *G06F 21/44* (2013.01); *G06F 21/6245* (2013.01); *G06Q 30/016* (2013.01)

(58) Field of Classification Search
CPC ...... G06Q 20/18; G06Q 30/016; G06Q 10/10; G05B 15/02; G06F 11/3409;
(Continued)

(56) References Cited

U.S. PATENT DOCUMENTS 5,646,535 A * 7/1997 Dornier ................... G06F 11/22
324/133
5,678,002 A * 10/1997 Fawcett ............. G06F 11/0709
709/224

(Continued)

OTHER PUBLICATIONS

Bigdaddyclint, "How to Make Flash Drive That Copy's Users Files Silently and Automatically : 7 Steps: How to Make a Flash Drive That Copy's Users Files Silently and Automatically," 2016, 18 Pages, Autodesk, Inc., http://www.instructables.com/id/How-to-make-flash-drive-that-copys-users-files-si/?ALLSTEPS.

*Primary Examiner* — Faisal M Zaman
(74) *Attorney, Agent, or Firm* — Joseph Mencher (57) ABSTRACT

A support information provisioning system a support device, an external device; and a customer device. The customer device includes an external connector and a remote access controller device that is coupled to the external connector. In situations where the customer device is experiencing at least one customer device issue that prevents the customer device from provisioning support information related to the operation of the customer device, the remote access controller device operates to detect that the external device has been connected to the external connector and, in response, automatically cause new support information about that customer device to be generated. When the external device is subsequently connected to the support device, it may then provide that new support information to the support device for analysis.

20 Claims, 7 Drawing Sheets (51) Int. Cl.
*G06Q 30/00* (2012.01)
*G06F 21/44* (2013.01)

(58) Field of Classification Search
CPC .............. G06F 11/0748; G06F 11/0772; G06F 11/3051; G06F 11/3072; G06F 11/3438; G06F 11/0751; G06F 11/2294; G06F 19/3418; G06F 13/102; G06F 21/44; G06F 21/6245
USPC ................ 709/217; 714/46, 11.173; 717/168
See application file for complete search history.

(56) References Cited

U.S. PATENT DOCUMENTS

| | | | | |
|---|---|---|---|---|
| 5,935,224 | A * | 8/1999 | Svancarek | G06F 13/385 463/36 |
| 6,061,802 | A * | 5/2000 | Gulick | G06F 1/12 713/400 |
| 6,170,067 | B1 | 1/2001 | Liu et al. | |
| 6,185,641 | B1 * | 2/2001 | Dunnihoo | G06F 5/065 710/56 |
| 6,754,310 | B1 * | 6/2004 | Steinbrenner | H04M 3/301 379/26.02 |
| 6,918,134 | B1 * | 7/2005 | Sherlock | B64D 11/0015 348/837 |
| 7,343,431 | B1 * | 3/2008 | Swaminathan | H04L 67/08 710/8 |
| 8,086,909 | B1 * | 12/2011 | Liu | G06F 11/0727 714/11 |
| 8,223,374 | B2 * | 7/2012 | Katou | G10L 17/26 358/1.15 |
| 9,817,709 | B2 * | 11/2017 | Gowin | G06F 11/0793 |
| 10,313,181 | B2 * | 6/2019 | Lockyer | H04L 41/04 |
| 10,489,231 | B1 * | 11/2019 | Gabay | G06F 11/079 |
| 2002/0073356 | A1 * | 6/2002 | Katayama | H04L 41/06 714/4.4 |
| 2003/0050010 | A1 | 3/2003 | Fallenstein | |
| 2003/0204588 | A1 * | 10/2003 | Peebles | G06F 11/3495 709/224 |
| 2004/0015559 | A1 * | 1/2004 | Goldstein | G06Q 30/02 709/217 |
| 2004/0078721 | A1 * | 4/2004 | Williams | G06F 11/2294 714/46 |
| 2005/0044107 | A1 * | 2/2005 | Widner | G06F 11/0748 |
| 2005/0044457 | A1 * | 2/2005 | Jeddeloh | G11C 29/48 714/718 |
| 2005/0097405 | A1 * | 5/2005 | Sesek | G06F 11/0733 714/48 |
| 2005/0122908 | A1 | 6/2005 | Soumiya et al. | |
| 2005/0273229 | A1 | 12/2005 | Steinmeier et al. | |
| 2006/0281452 | A1 * | 12/2006 | Anderton | H04W 24/00 455/423 |
| 2007/0110080 | A1 | 5/2007 | Bennett | |
| 2007/0250595 | A1 * | 10/2007 | Landfield | H04L 63/1441 709/218 |
| 2008/0231883 | A1 * | 9/2008 | Snyder | G06F 11/0772 358/1.15 |
| 2010/0011060 | A1 * | 1/2010 | Hilterbrand | H04L 67/108 709/204 |
| 2010/0023938 | A1 * | 1/2010 | Lee | H04L 41/06 717/171 |
| 2010/0131952 | A1 | 5/2010 | Akiyama et al. | |
| 2011/0055720 | A1 * | 3/2011 | Potter | G06F 3/017 715/747 |
| 2011/0055899 | A1 * | 3/2011 | Dollar | H04L 63/0485 726/3 |
| 2012/0041637 | A1 | 2/2012 | Allemang | |
| 2013/0159779 | A1 * | 6/2013 | Mickens | G06F 11/362 714/38.14 |
| 2013/0173964 | A1 | 7/2013 | Okano | |
| 2013/0227103 | A1 * | 8/2013 | Garimella | H04L 41/5054 709/223 |
| 2014/0089736 | A1 | 3/2014 | Okada | |
| 2015/0127979 | A1 | 5/2015 | Doppalapudi | |
| 2016/0050101 | A1 * | 2/2016 | Vaidya | H04L 41/0622 709/224 |
| 2016/0061468 | A1 * | 3/2016 | Alexander | F24F 11/62 700/276 |
| 2016/0125366 | A1 * | 5/2016 | McCaffrey | G06Q 10/1095 705/7.19 |
| 2016/0170792 | A1 * | 6/2016 | Kato | G06F 9/45558 718/1 |
| 2016/0180607 | A1 | 6/2016 | Wittliff | |
| 2016/0224406 | A1 | 8/2016 | Ilic | |
| 2016/0337200 | A1 * | 11/2016 | Wei | H04L 41/145 |
| 2017/0330195 | A1 * | 11/2017 | Lange | G06F 3/0486 |
| 2018/0005246 | A1 * | 1/2018 | Basam | G06Q 30/016 |

\* cited by examiner

SUPPORT INFORMATION PROVISIONING SYSTEM

CROSS-REFERENCE TO RELATED APPLICATIONS

This is a Continuation application to U.S. utility application Ser. No. 15/660,020 filed Jul. 26, 2017, entitled "SUPPORT INFORMATION PROVISIONING SYSTEM," the disclosure of which is incorporated herein by reference in its entirety.

BACKGROUND

The present disclosure relates generally to information handling systems, and more particularly to provisioning support information from an information handling system that has limited operational capabilities.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, server devices, collect support information generated during the operation of the server device and send that support information over a network to a customer support system. The collection of such support information allows for its use (by the customer support system or other device/network administrator) in detecting, addressing, and/or otherwise remedying issues that occur with the server device. However, in some situations, server devices may effected by issue(s) that result in those server devices having limited operational capabilities which can prevent the collection and provisioning of support information (or the sending of previously collected support information) to the customer support system or other device/network administrator. For example, some server devices may experience issue(s) that prevent those server devices from performing a Power On Self Test (POST) (sometimes referred to as a "no-POST event"), which can affect the ability of the server device to collect and/or provision support information. In addition to, or separately from, such no-POST events, server devices may experience issue(s) that prevent the operating system on those server devices from becoming available (sometimes referred to as a "no-OS event"), which can affect the ability of the server device to collect and/or provision support information. In addition to, or separately from, either of such no-POST events and no-OS events, server devices may experience issue(s) that prevent those server devices from providing information for display on a display device (sometimes referred to as a "no-video event"), which can affect the ability of the server device to collect and/or provision support information. In addition to, or separately from, any subset of such no-POST events, no OS events, and no-video events, server devices may experience issue(s) that prevent those server devices from performing network communications (sometimes referred to as a "no-network event"), which can affect the ability of the server device to collect and/or provision support information.

In any of the above scenarios, the server device may be connected to a power source, but the limited operational capabilities resulting from the no-POST, no-OS, no-video, and/or no-network event will prevent support information from being collected and/or retrieved for use in, for example, determining the issue with the server device that is causing that/those issue(s)/event(s). As such, the ability to diagnose the issue(s) occurring with such server devices is greatly limited, and many times results in components being replaced in the server device despite those components working properly.

Accordingly, it would be desirable to provide an improved support information provisioning system.

SUMMARY

According to one embodiment, an Information Handling System (IHS) includes a motherboard including an external connector; a processing system that is located on the motherboard and coupled to the external connector; and a memory system that is located on the motherboard and coupled to the processing system, wherein the memory system includes instructions that, when executed by the processing system, cause the processing system to provide a remote access controller engine that is configured, while the IHS is experiencing at least one IHS issue that prevents the IHS from provisioning support information related to the operation of the IHS, to: detect that an external device has been connected to the external connector; automatically cause, in response to detecting that the external device has been connected to the external connector, new support information about that IHS to be generated; and provide the new support information to the external device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
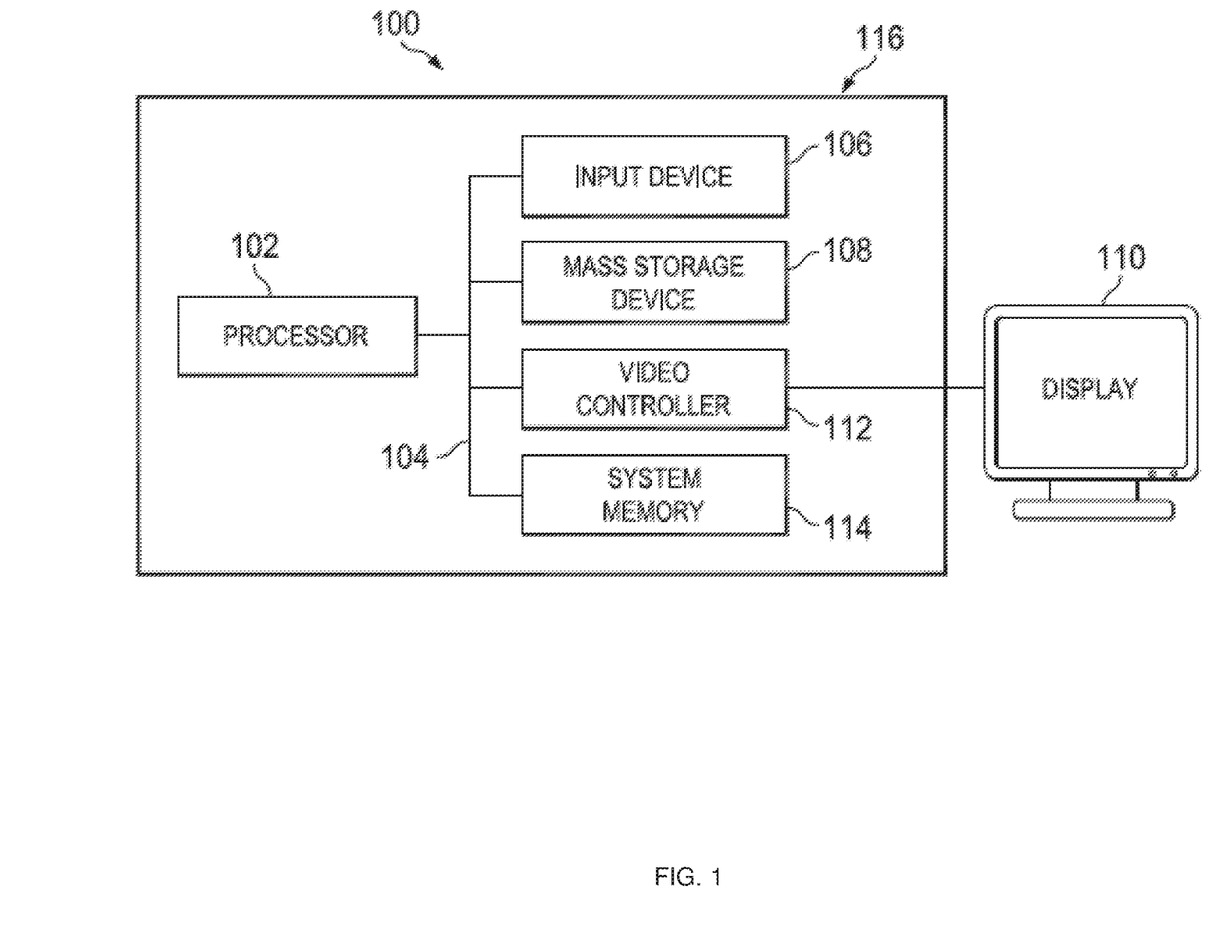
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
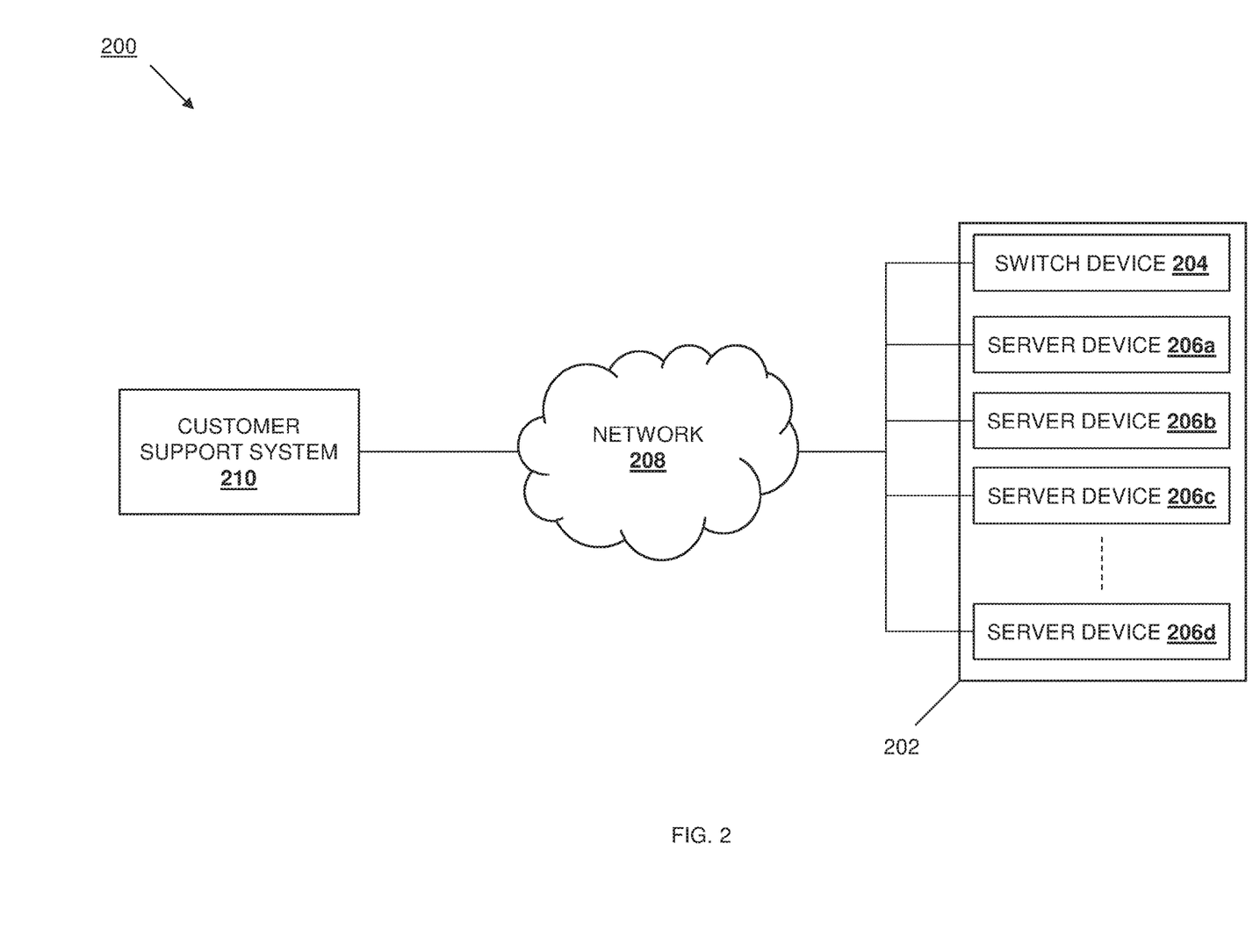
FIG. 2 is a schematic view illustrating an embodiment of a support information provisioning system.

Referring now to FIG. 2, an embodiment of a support information provisioning system 200 is illustrated. In the illustrated embodiment, the support information provisioning system 200 includes a rack 202 or other device chassis that houses a switch device 204 and a plurality of server devices 206*a*, 206*b*, 206*c*, and up to 206*d*. Any or all of the switch device 204 and the server devices 206*a*-*d* may be the IHS 100 discussed above with reference to FIG. 1, and/or may include some or all of the components of the IHS 100. However, while the specific embodiments discussed below include the device chassis housing switch device(s) and server device(s), in other embodiments the device chassis may be omitted and/or devices other than switch devices and server devices (e.g., storage devices and/or other device) may be utilized while remaining within the scope of the present disclosure. In the illustrated embodiment, each of the switch device 204 and the server devices 206*a*-*d* are coupled to a network 208. For example, any or all of the switch device 204 and the server devices 206*a*-*d* may include an out-of-band connection to the network 208. However, in other examples, any or all of the switch device 204 and the server devices 206*a*-*d* may include an in-band connection to the network 208 as well. Furthermore, in some examples, any or all of the server devices 206*a*-*d* may be connected to the network through the switch device 204. While a few examples have been provided, one of skill in the art in possession of the present disclosure will recognize that a variety of different network connections may be provided to the switch device 204 and/or the service device(s) 206*a*-*d* while remaining within the scope of the present disclosure. In the illustrated embodiment, a customer support system 210 is coupled to the network 208. In the examples below, the customer support system 210 may include one or more customer support devices that may be the IHS 100 discussed above with reference to FIG. 1, and/or may include some or all of the components of the IHS 100. However, one of skill in the art in possession of the present disclosure will recognize that customer support systems may be provided in a variety of manners that will remain within the scope of the present disclosure.

Figure 3:
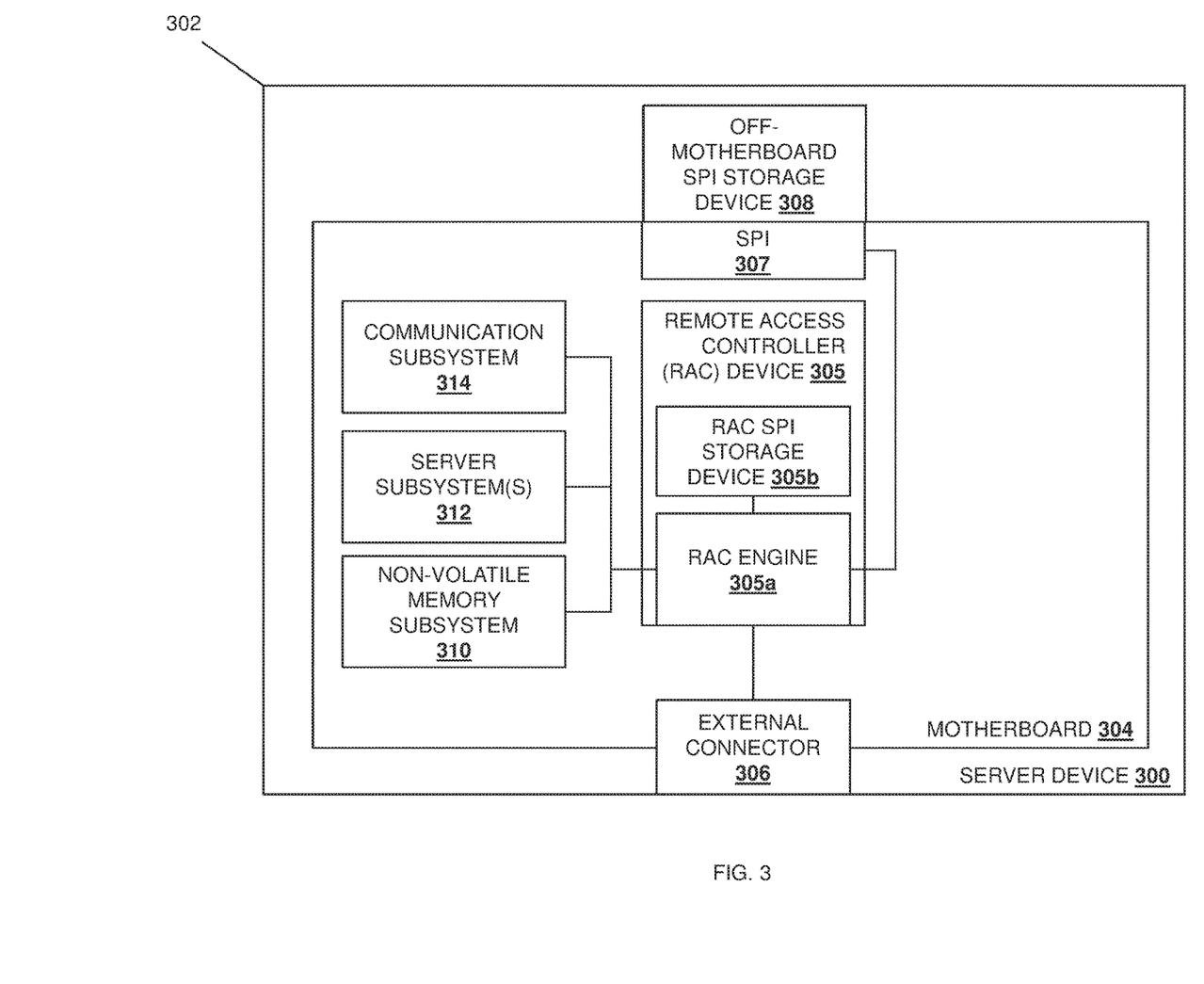
FIG. 3 is a schematic view illustrating an embodiment of a server device used in the support information provisioning system of FIG. 2.

Referring now to FIG. 3, an embodiment of a server device 300 is illustrated that may be any or all of the server devices 206*a*-*d* discussed above with reference to FIG. 2. As such, the server device 300 may be the IHS 100 discussed above with reference to FIG. 1, and/or may include some or all of the components of the IHS 100. In the illustrated embodiment, the server device 300 includes a chassis 302 that houses the components of the server device 300, only some of which are illustrated in FIG. 3. For example, the chassis 302 may house a motherboard 304 or other circuit board known in the art. In the illustrated embodiment, a remote access controller (RAC) device 305 is included on the motherboard 304. For example, the remote access controller device 305 may be an integrated Dell Remote Access Controller (iDRAC) available from DELL® Inc. of Round Rock, Tex., United States, although other remote access controllers will fall within the scope of the present disclosure as well. The remote access controller device 305 may include a RAC processing system (not illustrated, but which may include a processor similar to the processor 102 discussed above with reference to FIG. 1 (sometimes referred to as a "service processor" when provided in a RAC device) and a RAC memory system (not illustrated, but which may include memory similar to the system memory 114 discussed above with reference to FIG. 1) including instructions that, when executed by the RAC processing system, cause the RAC processing system to provide a RAC engine 305*a* that is configured to perform the functions of the RAC engines and remote access controller devices discussed below. In the illustrated embodiment, the remote access controller 305 also includes a RAC Serial Peripheral Interface (SPI) storage device 305*b* that is coupled to the RAC engine 305*a* (e.g., via a coupling between the RAC SPI storage device 305*b* and the RAC processing system) that may be provided by, for example, a flash memory device or other storage devices known in the art. In some embodiments, the RAC SPI storage device 305*b* may be considered an "on-motherboard" SPI storage device due to the RAC SPI storage device 305b being part of the remote access controller device 304 that is integrated into the motherboard 305.

The RAC engine 305a is also coupled to an external connector 306 (e.g., via a coupling between the RAC processing system and the external connector 306) that is accessible on a surface of the chassis 302. In the illustrated embodiment, the external connector 306 is mounted to the motherboard 304 and accessible on a surface of the chassis 302 (e.g., such that it is accessible on a front panel of a server chassis), while being coupled to the RAC engine 305a via a coupling (e.g., one or more traces) provided on the motherboard 304. However, in some embodiments, the external connector 306 may extend directly from the remote access controller device 305 such that it is accessible on a surface of the chassis 302 while remaining within the scope of the present disclosure as well. In an embodiment, the external connector 306 is a Universal Serial Bus (USB) connector, although one of skill in the art in possession of the present disclosure will recognize that other types of external connectors may be provided while remaining within the scope of the present disclosure.

In an embodiment, the server device 300 may incorporate subject matter developed by the inventors of the present disclosure and described in U.S. patent application Ser. No. 15/659,890, attorney docket number 16356.1864US01, filed on Jul. 26, 2017, the subject matter of which is incorporated by reference herein in its entirety. As such, an SPI 307 may be included on the motherboard 304 and coupled to the RAC engine 305a (e.g., via a coupling such as one or more traces between the RAC SPI storage device 305b and the RAC processing system.) One of skill in the art in possession of the present disclosure will recognize that the SPI 307 may be provided by a variety of SPI connectors and or SPI connections known in the art. An off-motherboard SPI storage device 308 is connected to the SPI 307. In an embodiment, the off-motherboard SPI storage device 308 may be a restore Serial Peripheral Interface (rSPI) card (sometimes referred to as a "front panel" SPI) that is available from DELL® Inc. of Round Rock, Tex., United States, although other off-motherboard SPI storage devices will fall within the scope of the present disclosure as well. The off-motherboard SPI storage device 308 may be considered "off-motherboard" due to the ability to connect it to, and disconnect it from, the SPI 307 such that it is located off the motherboard planar. For example, the rSPI card discussed above may be provided as a circuit board having an SPI connector that can be connected/disconnected with the SPI 307, and may include storage and other subsystems for providing the functionality discussed below.

In the illustrated embodiment, the server device 300 also includes a non-volatile memory subsystem 310 that is coupled to the motherboard 304 and the RAC engine 305a (e.g., via a coupling such as one or more traces between the memory subsystem connector(s) on the motherboard 304 and the RAC processing system.) For example, the non-volatile memory subsystem 310 may include one or more a Non-Volatile Dual Inline Memory Module (NVDIMM) devices, although other non-volatile memory subsystems will fall within the scope of the present disclosure as well. In the illustrated embodiment, the server device 300 also includes a one or more other server subsystem(s) 312 that may be included on or coupled to the motherboard 304 and the RAC engine 305a (e.g., via a coupling between that server subsystem and the RAC processing system.) For example, the server subsystem(s) 312 may include processing systems (e.g., central processing units (CPUs), network processing units (NPUs), etc.), memory systems, storage systems, display systems, power subsystems, and/or any other server subsystem that would be apparent to one of skill in the art in possession of the present disclosure. In the illustrated embodiment, the server device 300 also includes a communication subsystem 314 that is coupled to the motherboard 304 and the RAC engine 305a (e.g., via a coupling between the communication subsystem 314 and the RAC processing system.) For example, the communication subsystem 314 may include a Network Interface Controller (NIC), a wireless communication subsystem (e.g., a BLUETOOTH® communication subsystem, a Near Field Communication (NFC) subsystem, and/or other wireless subsystems known in the art, and may provide the connections between the switch device 206a/300 and the switch device 204, the other server devices 206b-d, and the network 208 discussed above with reference to FIG. 2. While the discussions below involve the server device 300, one of skill in the art in possession of the present disclosure will recognize that other devices (sometimes referred to as "customer devices" below) may benefit from the teachings of the present disclosure and thus will fall within its scope. Furthermore, while a specific server device has been described, one of skill in the art in possession of the present disclosure will recognize that server devices may include a variety of components other than those illustrated in order to provide conventional server device functionality, as well as the functionality discussed below, while remaining within the scope of the of the present disclosure.

Figure 4:
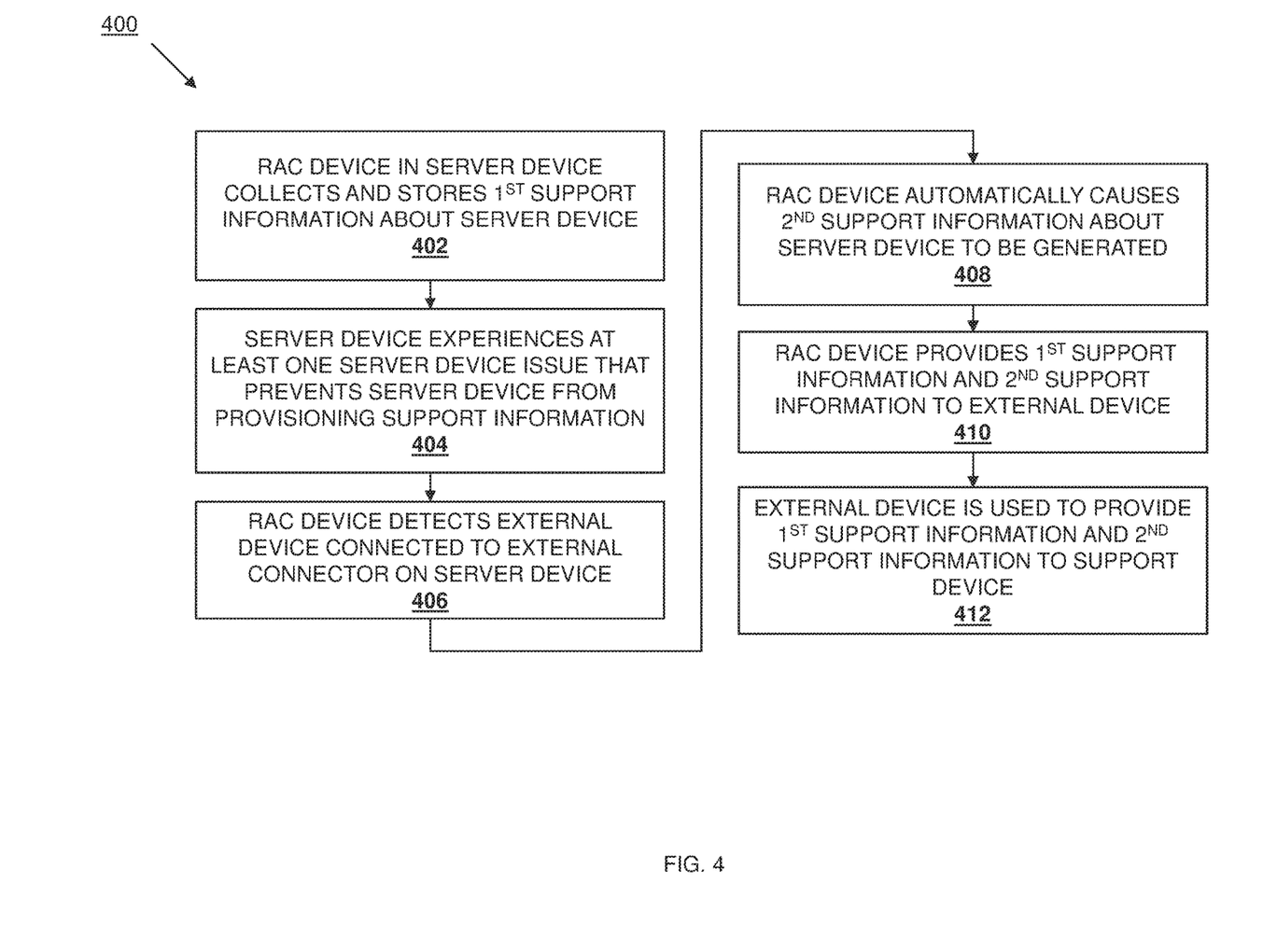
FIG. 4 is a flow chart illustrating a method for provisioning support information.

Referring now to FIG. 4, an embodiment of a method 400 for support information provisioning is illustrated. As discussed below, embodiments of the systems and methods of the present disclosure detect a connection of an external device to a server device that is experiencing a server device issue that otherwise prevents that server device from provisioning support information and, in response, automatically causes new support information about that server device to be generated and provided to the external device. The external device may then be disconnected from the server device and connected to a support device in order to transmit that new support information to that support device and/or to a customer support system via a network. In some embodiments, in addition to or separately from the generation and provisioning of the new support information, the detection of the connection of the external device to the server device may cause the automatic retrieval of previously stored support information and the provision of that previously stored information to the external device for subsequent transmittal to the support device and/or customer support system. As such, a server device that is experiencing a server device issue that otherwise prevents that server device from provisioning support information may be connected to a power source, and support information may then be collected and/or retrieved, and in some cases used to determine what is causing that/those issue(s)/event(s), enhancing the ability to diagnose the issue(s) occurring with such server devices, and preventing components from being replaced in the server device despite those components working properly.

Figure 5:
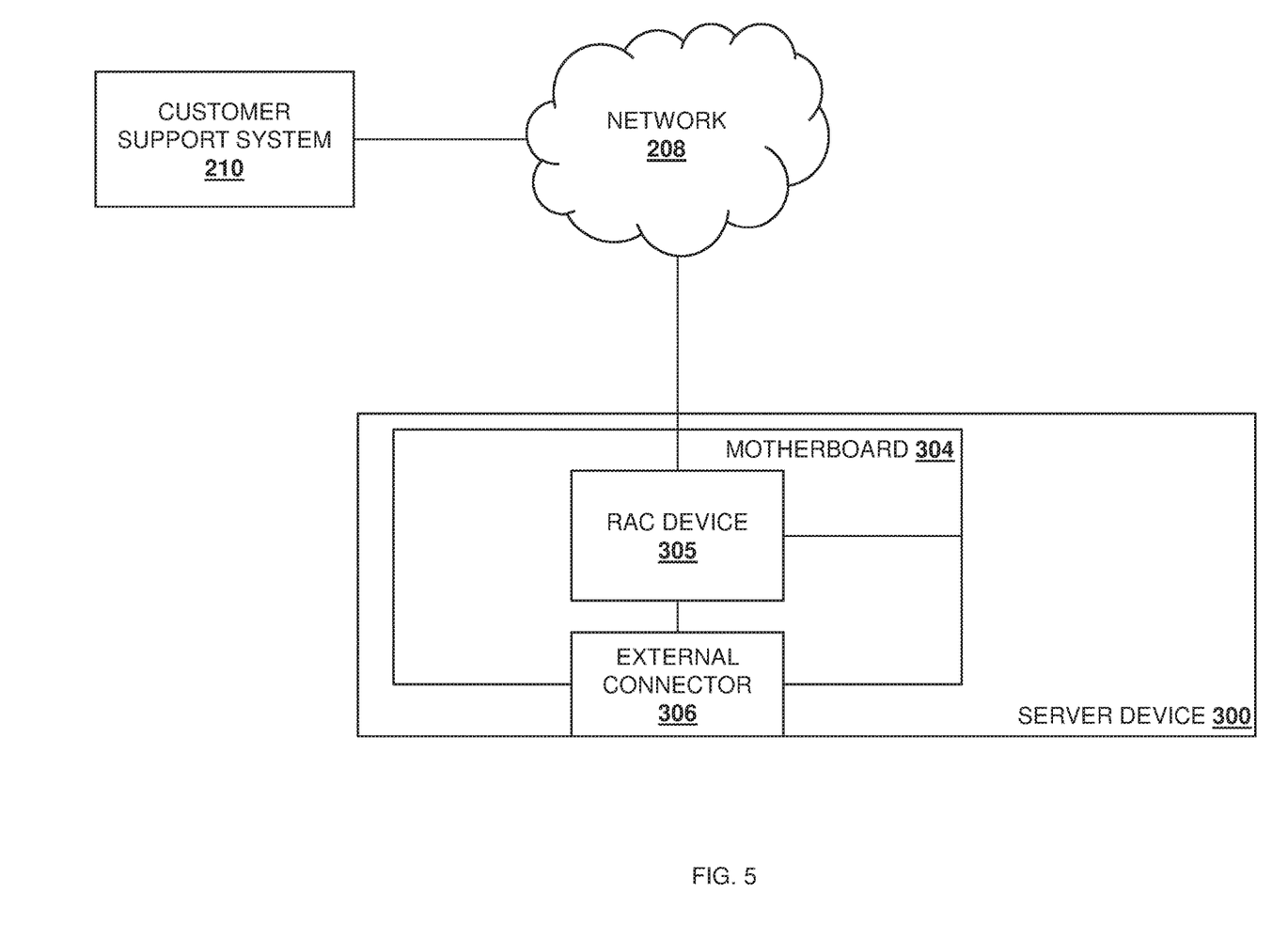
FIG. 5 is a schematic view illustrating embodiment of the server device of FIG. 3 provided in the support information provisioning system of FIG. 2.

The method 400 begins at block 402 where a remote access controller device in a server device collects and stores first support information about the server device. FIG. 5 illustrates an example of the server device 206a/300, prior to and/or at block 402, properly operating and, in response, generating support information. For example, proper operation of the server device 206a/300 may include the server device 206a/300 having performed and completed a POST, an operating system on the server device 206a/300 being available, the server device 206a/300 being capable of providing information for display on a display device, the server device properly performing network communications, and/or a variety of other functionality that one of skill in the art in possession of the present disclosure would recognize as proper functioning of a server device. In a specific example, the network communications may be properly performed in the server device 206a/300 in response to the remote access controller device 305 being properly configured to support those network communications such as, for example, by configuring the remote access controller device to perform out-of-band management communications.

Support information generated by the server device 206a/300 prior to and/or at block 402 may include server device logs (sometimes called "chassis logs) that describe the operation of the server device 206a/300, connected device logs (e.g., information about devices connected to the server device 206a/300 such as the switch device 204 and server devices 206b-d) that describe the operation of connected devices, remote access controller device logs that describe the operation of the remote access controller device 305, and/or other support information that would be apparent to one of skill in the art in possession of the present disclosure. In a specific example, support information may be generated via scheduled collections that are run on a periodic basis (e.g., Sunday mornings at 2 am), and may include system state information, device inventory information, firmware version information, operating system log information, application data information, lifecycle controller information, and/or other scheduled collection information known in the art. However, while specific examples of a properly operating server device 206a/300 and support information generated by that properly operating server device 206a/300 have been provided, one of skill in the art in possession of the present disclosure will recognize that proper operation of a server device (or other customer devices) may include a variety of functionality and may generate a variety of support information that will fall within the scope of the present disclosure as well.

In an embodiment, at block 402, the RAC engine 305a in the remote access controller device 305 may operate to monitor, copy, and/or otherwise collect the support information generated by the server device prior at and/or at block 402, and store that support information in at least one storage subsystem. For example, at block 402 the RAC engine 305a may operate to store the support information generated by the server device 206a/300 prior to and/or at block 402 in the RAC SPI storage device 305b. In addition, as discussed in detail in U.S. patent application Ser. No. 15/659,890, attorney docket number 16356.1864US01, filed on Jul. 26, 2017, the subject matter of which is incorporated by reference herein in its entirety, the RAC engine 305a may operate to store the support information generated by the server device 206a/300 prior to and/or at block 402 in the off-motherboard SPI storage device 308 and/or in the non-volatile memory subsystem 310. For purposes of the discussion below, the storage of support information generated by the server device prior to and/or at block 402 provides previously stored support information in at least one storage subsystem in the server device 206a/300.

The method 400 then proceeds to block 404 where the server device experiences at least one server device issue that prevents the server device from provisioning support information. As would be understood by one of skill in the art in possession of the present disclosure, conventional server devices must satisfy at least the following prerequisites in order to provision support information through a network: 1) a supported operating system must be installed on the server device, 3) a support agent must be running in that supported operating system, and 3) the server device must have a network connection to the customer support system. In an embodiment of block 404, at least one of the above-listed prerequisites have not been satisfied, and thus the provisioning of support information directly to the customer support system is prevented.

In some examples, at block 404, the server device 206a/300 may experience one or more server device issues that prevent the server device 206a/300 from performing a POST and that result in a no-POST event, the server device 206a/300 may experience one or more server device issues that prevent the operating system on the server device 206a/300 from becoming available and that result in a no-OS event, the server device 206a/300 may experience one or more server device issues that prevent the server device 206a/300 from providing information for display on a display device and that result in a no-video event, the server device 206a/300 may experience one or more server device issues that prevent the server device 206a/300 from performing network communications and that result in a no-network event, and/or a variety of other server device issues that would be apparent to one of the skill in the art in possession of the present disclosure and that prevent the server device 206a/300 from provisioning support information about the server device 206a/300. In a specific example, at block 404 the remote access controller device 305 may not be configured for out-of-band management communications (e.g., in a factory setting when the server device 206a/300 is being manufactured and/or assembled, or in some other restricted environment), which may prevent the server device 206a/300 (which is functioning properly) from provisioning support information at block 404. In another specific example, the inability of the server device 206a/300 to provision support information through the network 208 to the customer support system 210 may be a result of that server device 206a/300 having had its motherboard replaced (e.g., with the motherboard 304) and there being no network interface or connection available to access support information stored on the remote access controller device 305.

For example, the one or more server device issues may result from failures or malfunctions in the Basic Input-Output System (BIOS) included in the server device 206a/300, failures or malfunctions in the motherboard 304 in the server device 206a/300, failures or malfunctions in the Peripheral Component Interconnect express (PCIe) subsystem in the server device 206a/300, other hardware failures or malfunctions, and/or a variety of other server device issues that would be apparent to one of skill in the art in possession of the present disclosure. However, in some embodiments, the one or more server device issues may not result from failures or malfunctions in the server device 206a/300, but rather may result for other reasons. For example, the inability of the server device 206a/300 to provision support information through the network 208 to the customer support system 210 may be a result of that server device 206a/300 being located in a datacenter that does not allow that server device 206a/300 to be connected to the network 208 for security reasons. Similarly, the inability of the server device 206a/300 to provision support information through the network 208 to the customer support system 210 may be a result of that server device 206a/300 being located in a manufacturing/factory facility that that does not allow that server device 206a/300 to be connected to the network 208 in order to prevent viruses and/or other security issues with the manufactured products. As such, a wide variety of server "issues" that prevent conventional support information provisioning (e.g., through the network to the customer support system 210 by the remote access controller device 305) will fall within the scope of the present disclosure.

In some embodiments, at block 404 one or more subsystems in the server device 206a/300 may be replaced. In some examples, the communication subsystem 314 (or one or more of its components), one or more of the server subsystem(s) 312 (or one or more their components), and or any other subsystem in the server device 300 may be replaced at block 404. In a specific example, the motherboard 304 (or one or more of its components) may be replaced (i.e., with a different motherboard or motherboard components) at block 404. In those specific examples, the remote access controller device (and its components) on that replacement motherboard may be different than the remote access controller device 305 (i.e., that performed block 402 of the method 400), but may operate substantially similarly to the remote access controller device 305 discussed below. However, in other embodiments, no subsystems in the server device 206a/300 are replaced at block 404.

Figure 6:
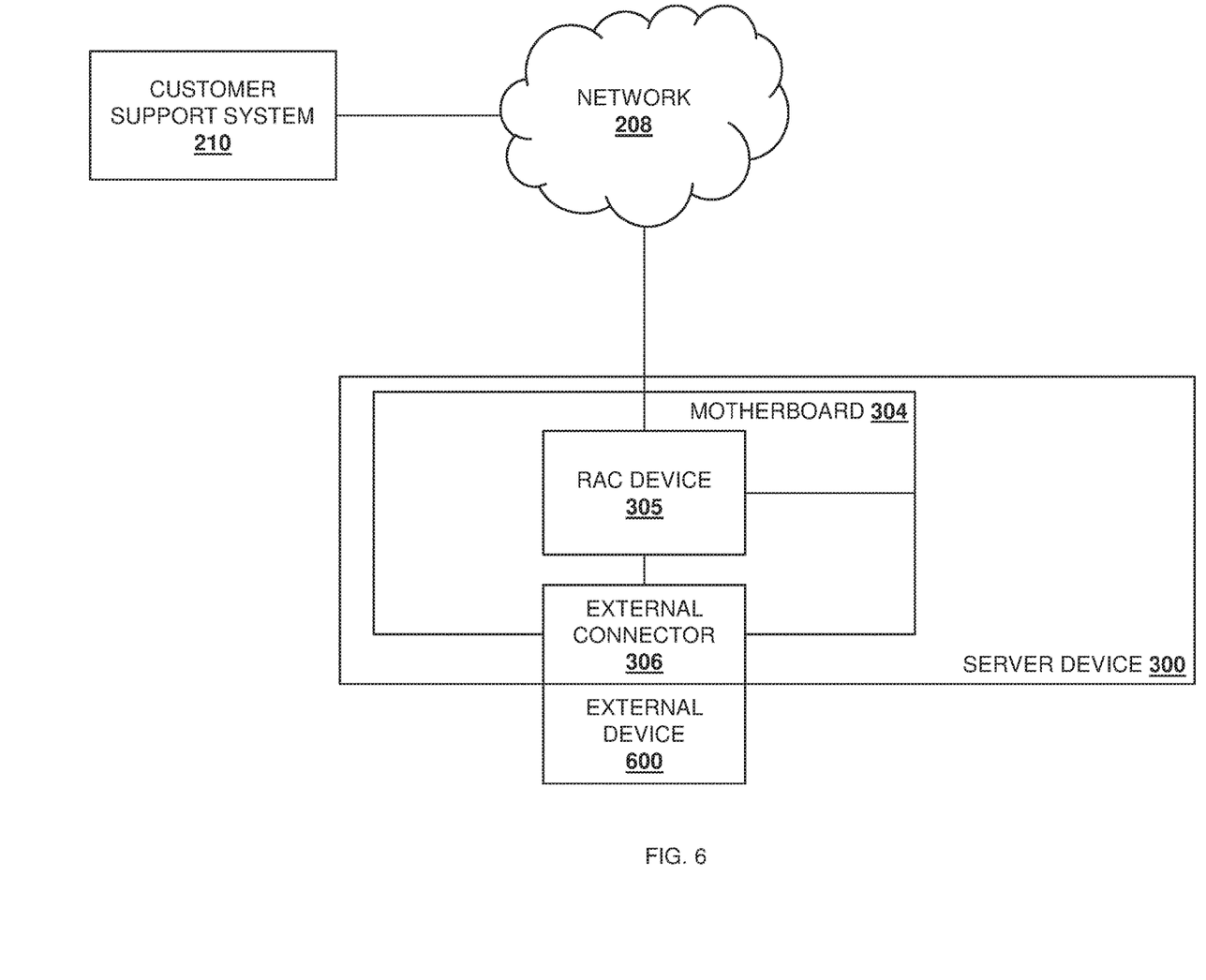
FIG. 6 is a schematic view illustrating an embodiment of an external device coupled to the server device in the support information provisioning system of FIG. 5 when that server device is experiencing limited operational capabilities.

The method 400 then proceeds to block 406 where the remote access controller device detects an external device connected to an external connector on the server device. FIG. 6 illustrates an embodiment of block 406 with an external device 600 connected to the external connector 306 on the server device 206a/300. For example, the external device 600 is described below as a USB storage device, but one of skill in the art in possession of the present disclosure will recognize that the external device 600 may include any device that is compatible to connect to the external connector 306 and that includes a storage subsystem for storing the support information as discussed below. In an embodiment of block 406, the RAC engine 305a of the remote access controller device 305 in the server device 206a/300 may operate to monitor the external connector 306 and detect the connection of the external device 600 at block 406. For example, power may be provided to the server device 206a/300 (e.g., by connecting a power subsystem (e.g., one of the server subsystems 312) to a power source), which in turn provides power to the remote access controller device 305. In a specific example, a user may enable a battery (e.g., a Complementary Metal-Oxide Semiconductor (CMOS) battery) to power the remote access controller device 305 when the server device 206a/300 is powered off (also known as "flea power") so that the remote access controller device 305 is available, and then connect the external device 600 to the external connector 306. The RAC engine 305a in the remote access controller device 305 may be configured to utilize that power to monitor the external connector 306 and detect when the external device 600 is connected to the external connector 306 (e.g., via a standard "plug-and-play" device detection mechanism). As such, despite the server device 206a/300 experiencing the server device issue(s) that prevent the server device 206a/300 from provisioning support information, the powering of the server device 206a/300 enables the remote access controller device 305 to operate to monitor the external connector 306 for the connection of the external device 600 at block 406, as well as perform the other functionality discussed below.

In an embodiment, following the detection of the connection of the external device 600 to the external connector 306, the RAC engine 305a in the remote access controller device 305 may operate to determine whether authorization information is included on the external device 600. For example, the remote access controller device 305 may store an authorization signature or other authorization information, and prior to connecting the external device 600 to the external connector 306, a user, network administrator, or customer support representative may provide that authorization signature or other authorization information on a storage subsystem on the external device 600 in order to allow that external device 600 to be used in the method 400. At block 406, RAC engine 305a may then access the storage subsystem on the external device 600, identify information stored on that storage subsystem, and determine whether any of that identified information matches the authorization information stored in the remote access controller device 305. In response to determining that the identified information matches the authorization information stored in the remote access controller device 305, the RAC engine 305a determines that authorization information is included on the external device 600 and the method 400 may proceed to block 408. However, in response to determining that the identified information does not match the authorization information stored in the remote access controller device 305, the RAC engine 305a determines that authorization information is not included on the external device 600, and RAC engine 305a may prevent support information from being provided on the external device 600 as discussed below. As such, authorization information may be required on external devices used with the support information provisioning system of the present disclosure to ensure security of that support information by only provisioning that support information on authorized external devices.

The method 400 then proceeds to block 408 where the remote access controller automatically causes second support information about the server device to be generated. In an embodiment, at block 408 and in response to detecting the connection of the external device 600 to the external connector 306, the RAC engine 305a operates to automatically cause the support information about the server device 206a/300 to be generated (e.g., support information generated subsequent to the server device 206a/300 experiencing the server device issue(s) discussed above). For example, at block 408, the RAC engine 305a may cause the generation of server device logs (sometimes called "chassis logs") that describe the limited operational capabilities of the server device 206a/300 as a result of the server device issue(s), connected device logs (e.g., information about devices connected to the server device 206a/300 such as the switch device 204 and server devices 206b-d) that describe the operation of connected devices, remote access controller device logs that describe the operation of the remote access controller device 305, storage logs, operating system logs (e.g., if the service module is operating and the operating system collector (OSC) is available), and/or other support information that would be apparent to one of skill in the art in possession of the present disclosure. In a specific example of support information generated for a server device that is not functioning property, such support information may include system state information, device inventory information, firmware version information, cached information, filtered operating system log information, application data information, lifecycle controller log information, and/or other support information known in the art. However, while specific examples of support information generated by the server device 206a/300 with limited operational capabilities have been provided, one of skill in the art in possession of the present disclosure will recognize that improper operation of a server device (or other customer devices) may include a variety of functionality and may generate a variety of support information that will fall within the scope of the present disclosure as well.

In an embodiment, at block 408, the RAC engine 305a in the remote access controller device 305 may operate to store the support information that was generated at block 408 in at least one storage subsystem. For example, at block 408 the RAC engine 305a may operate to store the support information generated at block 408 in the RAC SPI storage device 305b. In addition, as discussed in detail in U.S. patent application Ser. No. 15/659,890, attorney docket number 16356.1864US01, filed on Jul. 26, 2017, the subject matter of which is incorporated by reference herein in its entirety, the RAC engine 305a may operate to store the support information generated at block 408 in the off-motherboard SPI storage device 308 and/or in the non-volatile memory subsystem 310. However, in other embodiments, the support information generated at block 408 may be immediately written to the external device at block 410, discussed below, rather than storing it on the server device 206a/300. For purposes of the discussion below, the generation of support information at block 408 provides new support information that, in some embodiments, may be stored in at least one storage subsystem in the server device 206a/300.

The method 400 then proceeds to block 410 where the remote access controller device provides the first support information and the second support information to the external device. In an embodiment, at block 410, the RAC engine 305a may operate to provide the previously stored support information and/or the new support information through the external connector 306 to the external device 600. For example, at block 410, the RAC engine 305a may retrieve (e.g., copy) the previously stored support information from the RAC SPI storage device 305b, the off-motherboard SPI storage device 308, and/or the non-volatile memory subsystem 310, and provide (e.g., write) that previously stored support information on the storage subsystem provided on the external device 600. Similarly, at block 410, the RAC engine 305a may retrieve (e.g., copy) the new support information from the RAC SPI storage device 305b, the off-motherboard SPI storage device 308, and/or the non-volatile memory subsystem 310, and provide (e.g., write) that new support information on the storage subsystem provided on the external device 600. However, as discussed above, at block 410 the RAC engine 305a may write the new support information directly to the external device 600 while remaining within the scope of the present disclosure as well. While the method 400 is illustrated and described as including the provisioning of both the previously stored support information and the new support information to the external device 600, the method 400 may be performed to provide only the previously stored support information on the external device 600, or only the new support information on the external device 600, while remaining within the scope of the present disclosure as well.

In an embodiment, at block 410 and prior to providing the previously stored support information and/or the new support information to the external device 600, the RAC engine 305a may operate to determine whether that support information includes private customer information and, if so, remove the private customer information from the support information before providing the support information on the external device 600. For example, at block 410 the RAC engine 305a may analyze the previously stored support information and/or the new support information and determine whether it includes Media Access Control (MAC) addresses, Internet Protocol (IP) addresses, host system names, settings that indicate a user name, and/or any other primate customer information that would be apparent to one of skill in the art in possession of the present disclosure. As such, the previously stored support information and/or the new support information may be filtered before provisioning on the external device 600 to ensure that private customer information (or any other information defined by the system provider or customer) is not provisioned on the external device 600.

Figure 7:
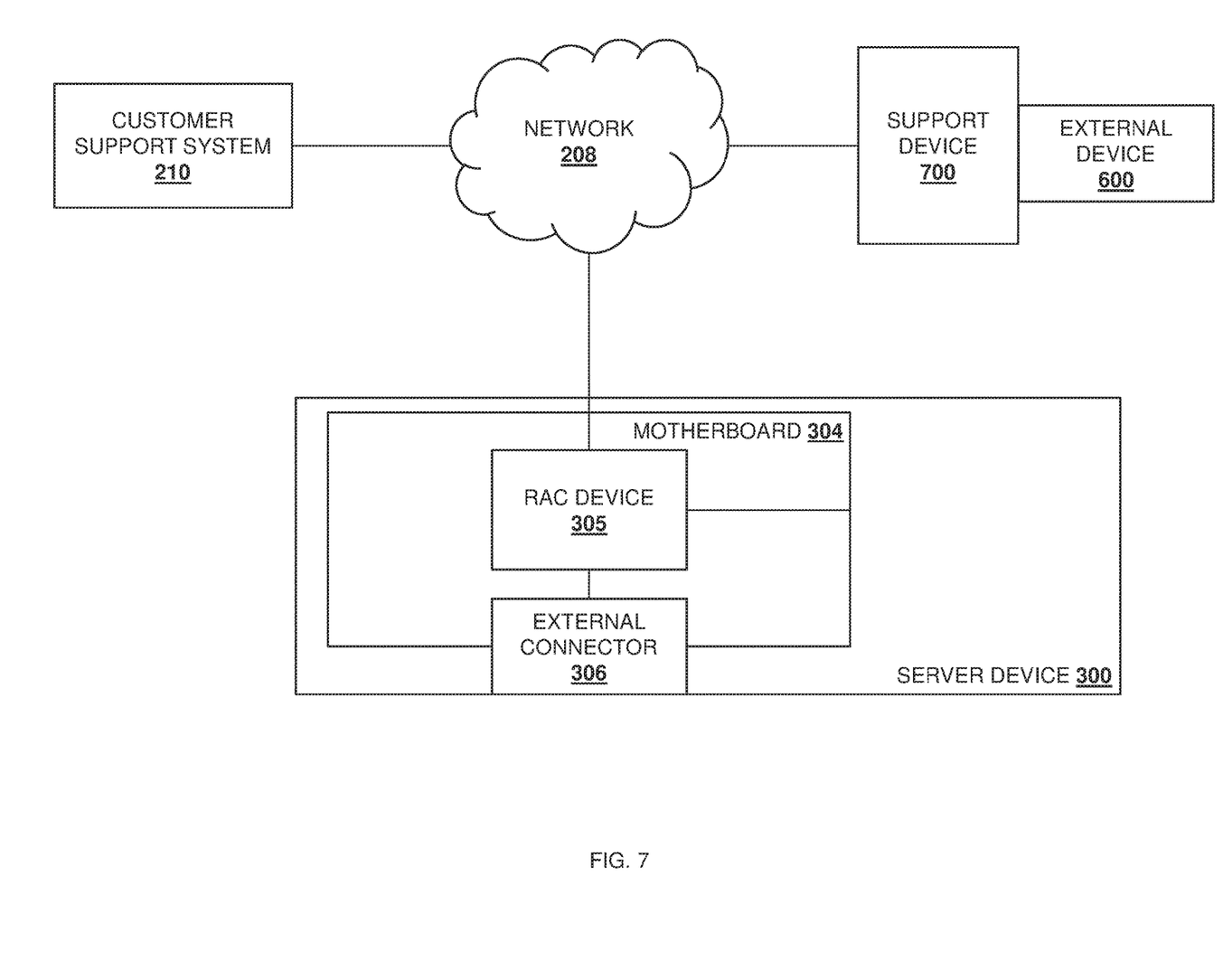
FIG. 7 is a schematic view illustrating an embodiment of the external device of FIG. 6 connected to a support device.

The method 400 then proceeds to block 412 where the external device is used to provide the first support information and the second support information to at least one support device. FIG. 7 illustrates an embodiment of block 412 in which the external device 600 has been disconnected from the external connector 306 on the server device 300, and connected to a support device 700 that is connected through the network 208 to the customer support system 210. As such, in some embodiments, the connection of the external device 600 to the support device 700 may allow the previously stored support information and/or the new support information provided on the external device 600 to be provided to the support device 700 and then transmitted through the network to the customer support system. However, in some examples, rather than using a support device (i.e., the support device 700 that is operated by a customer support technician), the external device 600 may be connected to a user system (e.g., a properly operating laptop/notebook computer or desktop computer) in place of the support device 700, and then transmitted through the network to the customer support system 210. In another example, rather than using the support device 700, the external device 600 may be connected to one of the other server devices 206b-d (e.g., a properly operating server device) in place of the support device 700, and then transmitted through the network to the customer support system (e.g., as part of that server devices support information provisioning, or in a separate support information provisioning). Furthermore, rather than transmitting the previously stored support information and/or the new support information through the network to the customer support system 210, that information may instead simply be provided on the support device 700. In any of the situations described above, the previously stored support information and/or the new support information may be utilized by the customer support representative operating the support device 700 or the customer support system 210 for analysis and, in some cases, to diagnose the server device issue(s) or otherwise provide customer support for the server device 206a/300.

Thus, systems and methods have been described that provide for the connection of an external device to a server device that is experiencing a server device issue that otherwise prevents that server device from provisioning support information and, in response to connecting that external device, new support information about that server device is automatically generated and provided to the external device. The external device may then be disconnected from the server device, and connected to a support device to transmit that new support information to that support device and/or to a customer support system via a network so that the information may be analyzed and, in some situations, used to diagnose the server device issue(s). As discussed above, the detection of the connection of the external device to the server device may cause the automatic retrieval of previously stored support information and the provision of that previously stored information to the external device in place of, or in addition to, the generation and provisioning of the new support information. As such, a server device that is experiencing a server device issue that otherwise prevents that server device from provisioning support information may be connected to a power source, and support information may then be collected and/or retrieved and analyzed, enhancing the ability to diagnose the issue(s) occurring with such server devices, and preventing components from being replaced in the server device despite those components working properly Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A support information provisioning system, comprising:
   a support device;
   an external device; and
   a computing device that is configured, while the computing device is experiencing at least one computing device issue that prevents the computing device from provisioning support information related to the operation of the computing device via a primary provisioning route that 1) includes a network and that 2) otherwise allows the computing device to provision support information through the network when the computing device is not experiencing the at least one computing device issue, to:
   detect that the external device has been connected to the computing device;
   automatically generate, in response to detecting that the external device has been connected to the computing device, support information related to the operation of the computing device subsequent to experiencing the at least one computing device issue; and
   automatically provide the support information to the external device, wherein the external device is configured to subsequently provide the support information to the support device following disconnection of the external device from the computing device and connection of the external device to the support device.

2. The system of claim 1, wherein the computing device includes at least one storage subsystem, and wherein the computing device is configured, while the computing device is experiencing the at least one computing device issue, to:
   automatically retrieve, from the at least one storage subsystem in response to detecting that the external device has been connected to the computing device, previously stored support information about the computing device; and
   automatically provide the previously stored support information to the external device, wherein the external device is configured to subsequently provide the previously stored support information to the support device following connection of the external device to the support device.

3. The system of claim 1, wherein the external device is connected to the computing device via a Universal Serial Bus (USB) connector included on the computing device.

4. The system of claim 1, wherein the at least one computing device issue includes at least one of a no Power On Self Test (no-POST) event, a no Operating System (no-OS) event, a no-video event, and a no-network event.

5. The system of claim 1, wherein the computing device is configured, while the computing device is experiencing the at least one computing device issue, to:
   determine that the external device includes authorization information; and
   automatically generate, in response to detecting that the external device has been connected to the computing device and determining that the external device includes the authorization information, the support information about the computing device.

6. The system of claim 1, wherein the computing device is configured, while the computing device is experiencing the at least one computing device issue, to:
   determine private customer information that is included in the support information; and
   remove the private customer information from the support information prior to providing the support information to the external device.

7. The system of claim 1, wherein the support information includes at least one of: logs generated subsequent to the computing device experiencing the at least one computing device issue, chassis logs, and connected device logs.

8. An Information Handling System (IHS), comprising
   a processing system; and
   a memory system that is coupled to the processing system, wherein the memory system includes instructions that, when executed by the processing system, cause the processing system to provide a support information engine that is configured, while the Information Handling System (IHS) is experiencing at least one IHS issue that prevents the IHS from provisioning support information related to the operation of the IHS via a primary provisioning route that 1) includes a network and that 2) otherwise allows the IHS to provision support information through the network when the IHS is not experiencing the at least one IHS issue, to:
   detect that an external device has been connected to the IHS;
   automatically generate, in response to detecting that the external device has been connected to the IHS, support information related to the operation of the IHS subsequent to experiencing the at least one IHS issue; and
   automatically provide the support information to the external device.

9. The IHS of claim 8, further comprising:
   at least one storage subsystem that is coupled to the processing system, wherein the support information engine is configured, while the IHS is experiencing at least one IHS issue, to:
   automatically retrieve, from the at least one storage subsystem in response to detecting that the external device has been connected to the IHS, previously stored support information about the IHS; and
   automatically provide the previously stored support information to the external device.

10. The IHS of claim 8, wherein the external device is connected to the IHS via a Universal Serial Bus (USB) connector that is coupled to the processing system.

11. The IHS of claim 8, wherein the at least one IHS issue includes at least one of a no Power On Self Test (no-POST) event, a no Operating System (no-OS) event, a no-video event, and a no-network event.

12. The IHS of claim 8, wherein the support information engine is configured, while the IHS is experiencing the at least one IHS issue, to:
   determine that the external device includes authorization information; and automatically generate, in response to detecting that the external device has been connected to the IHS and determining that the external device includes the authorization information, the support information about the IHS.

13. The IHS of claim 8, wherein the support information engine is configured, while the IHS is experiencing the at least one IHS issue, to:
   determine private customer information that is included in the support information; and
   remove the private customer information from the support information prior to providing the support information to the external device.

14. A method for providing support information, comprising:
   detecting, by a computing device while the computing device is experiencing at least one computing device issue that prevents the computing device from provisioning support information related to the operation of the computing device via a primary provisioning route that 1) includes a network and that 2) otherwise allows the computing device to provision support information through the network while the computing device is not experiencing the at least one computing device issue, that an external device has been connected to the computing device;
   automatically generating, by the computing device in response to detecting that the external device has been connected to the computing device, support information related to the operation of the computing device subsequent to experiencing the at least one computing device issue; and
   automatically providing, by the computing device, the support information to the external device.

15. The method of claim 14, further comprising:
   automatically retrieving, by the computing device from at least one storage subsystem included in the computing device and in response to detecting that the external device has been connected to the computing device, previously stored support information about the computing device; and
   automatically providing, by the computing device, the previously stored support information to the external device.

16. The method of claim 14, wherein the external device is connected to the computing device via a Universal Serial Bus (USB) connector.

17. The method of claim 14, wherein the at least one computing device issue includes at least one of a no Power On Self Test (no-POST) event, a no Operating System (no-OS) event, a no-video event, and a no-network event.

18. The method of claim 14, further comprising:
   determining, by the computing device while the computing device is experiencing at least one computing device issue, that the external device includes authorization information; and
   automatically generating, by the computing device in response to detecting that the external device has been connected to the computing device and determining that the external device includes the authorization information, the support information about the computing device.

19. The method of claim 14, further comprising:
   determining, by the computing device while the computing device is experiencing at least one computing device issue, private customer information that is included in the support information; and
   removing, by the computing device, the private customer information from the support information prior to providing the support information to the external device.

20. The method of claim 14, wherein the support information includes at least one of: logs generates subsequent to the computing device experiencing the at least one computing device issue, chassis logs, and connected device logs.

* * * * *